United States Patent [19]
Saether

[11] Patent Number: 5,369,324
[45] Date of Patent: Nov. 29, 1994

[54] ELECTRIC STEPPER MOTOR

[75] Inventor: Gustav Saether, Leksvik, Norway

[73] Assignee: Lyng Elektronikk A-S, Vanvikan, Norway

[21] Appl. No.: 92,092

[22] Filed: Jul. 16, 1993

[30] Foreign Application Priority Data

Jul. 17, 1992 [NO] Norway ................ 92.2844

[51] Int. Cl.⁵ ........................................ H02K 37/00
[52] U.S. Cl. ......................... 310/49 R; 310/67 R; 310/68 B; 310/75 R; 310/156; 310/179
[58] Field of Search ............ 310/49 R, 67 R, 156, 310/162, 216, 75 R, 68 B, DIG. 6, 179, 180, 184, 254, 263, 42

[56] References Cited

U.S. PATENT DOCUMENTS

| | | | |
|---|---|---|---|
| Re. 28,075 | 7/1974 | Kavanaugh | 310/49 R |
| 3,783,313 | 1/1974 | Mathur | 310/49 R |
| 4,075,519 | 2/1978 | Mrcun | 310/67 R |
| 4,280,072 | 7/1981 | Gotou et al. | |
| 5,200,776 | 4/1993 | Sakamoto | 310/68 B |

FOREIGN PATENT DOCUMENTS

300126  1/1989  European Pat. Off.
2211030 12/1988 United Kingdom.

Primary Examiner—R. Skudy
Attorney, Agent, or Firm—Keck, Mahin & Cate

[57] ABSTRACT

An electric motor consisting of an inside stator part and a rotor part placed outside and concentrically in relation to the stator part, has a high number of permanent magnets (13) on the inside of the rotor part. The magnetic fields from these permanent magnets interact with magnetic fields between flux-conducting lamella blocks (30, 35) engaging the coil cores (8) on the stator. The lamella blocks (30, 35) are T- and Γ-shaped with top beams (25, 27) pointing in directions parallel to the axis, and the top beams (25, 27) are positioned to provide substantially circumferentially directed magnetic fields in flux gaps (36) therebetween. The magnetic fields in the flux gaps (36) between the top beams (25, 27) are reversed in successive order, and under time control from an electronic regulator.

10 Claims, 8 Drawing Sheets

FIG. 13

ELECTRIC STEPPER MOTOR

FIELD OF THE INVENTION

The present invention relates to an electric motor, more specifically a stepper motor. As a starting point the motor has quite general options for application, but it is particularly constructed with the intent to drive a vehicle without following a course via clutch, gearbox, countershaft (possibly a belt drive) and differential. This is achieved by building the stator part of the motor into the drive wheel itself, and by making the rotor part a main part of the wheel rim. In accordance with the desired vehicle power, one or several wheels of this type are mounted. When the motor is to be used for other purposes, the rotor part is appropriately designed on its outside for the application in question.

BACKGROUND OF THE INVENTION

There is previously known from U.S. Pat. No. 4,280,072 a motor with some features which exhibit similarity with the present invention. According to the embodiment shown in FIGS. 9 and 10 of said U.S. patent, an outer rotor part is used which comprises four inside-mounted magnets, each covering an angular range of 90° of the entire circumference. The inside stator part comprises four components which are similar to cog rims, however these components do not comprise circumferentially uniformly distributed flux conducting elements or "fingers". There are two so-called "poles" on each component, each respective pole being divided into three "teeth", and each such pole range covers about 90°. Three "teeth" extend in between three corresponding "teeth" on an oppositely facing component, and a corresponding set of two components are found right next to the first two components, with a 45° shift in relation to the first set.

A serious question must be asked regarding the ability of the above mentioned motor regarding achieving a successively and uniformly increasing rpm from standstill to the desired rotation speed, due to the small number of magnets in the rotor part and the correspondingly small number of "poles" on the stator part, i.e. with only two "pole ranges" on each cog rim-like component. However, it appears from said U.S. patent that the electric machine primarily is a sort of asyncronous generator, so that the motor aspect is a secondary consideration, at least regarding the ability to provide a high torque. In the motor function, said U.S. patent attaches most importance to a smooth and "ripple"-free running. Besides, a main feature of said U.S. patent is that the angle between the "step intervals" in the "poles" on the stator part should not be equal to the angle between the magnet pole centers on the rotor part. This is an unfortunate feature regarding achieving a high torque.

From British patent application, publication no. 2,211,030 is previously known a stepper motor based upon some of the same principles as the present invention, but which as a starting point has a reversed construction, i.e. with the rotor placed in center and the stator on the outside. Thus, the motor is not directly usable in the manner mentioned in the first section of this specification. Besides, the construction of the flux-conducting elements in the stator part is more similar to an abandoned development stage of the the present invention, with axially inward bent fingers from annular plates conducting flux from the stator coils.

SUMMARY OF THE INVENTION

The present invention has as its main object to provide a motor with a high torque.

BRIEF DESCRIPTION OF THE DRAWINGS

The invention shall be illuminated further by first describing the above mentioned abandoned development stage, in order to provide a better understanding of the detailed embodiment example of the present invention, which embodiment example follows thereafter, and it will be referred to the appended drawings, where FIGS. 1-6 show the prior art and FIGS. 7-13 show the invention:

Further, there is shown in FIG. 7, with a corresponding sketch as in FIG. 1, a motor wheel in accordance with the simplest embodiment of the present invention, i.e. an embodiment with two coils in the stator, in FIG. 8 a cross section through a part of the same motor wheel as in FIG. 7, in analogy with FIG. 2, in FIGS. 9 and 10 the shape of the flat lamellae which in the present invention compose flux-conducting blocks having T- and Γ-shapes.

DETAILED DESCRIPTION OF THE PREFERRED EMBODIMENTS

The motor in accordance with the invention is provided with energy from a current source which via an electrical regulator supplies power to the motor coils, which power is variably controlled both regarding voltage level and frequency. The regulator constitutes per se no part of the present invention, which relates only to the motor itself. However, the motor comprises preferably sensor elements for feedback to the regulator regarding the instant motor condition (speed, rotation direction, position), so that the regulator may adapt the current feed in a correct manner.

Figure 1:
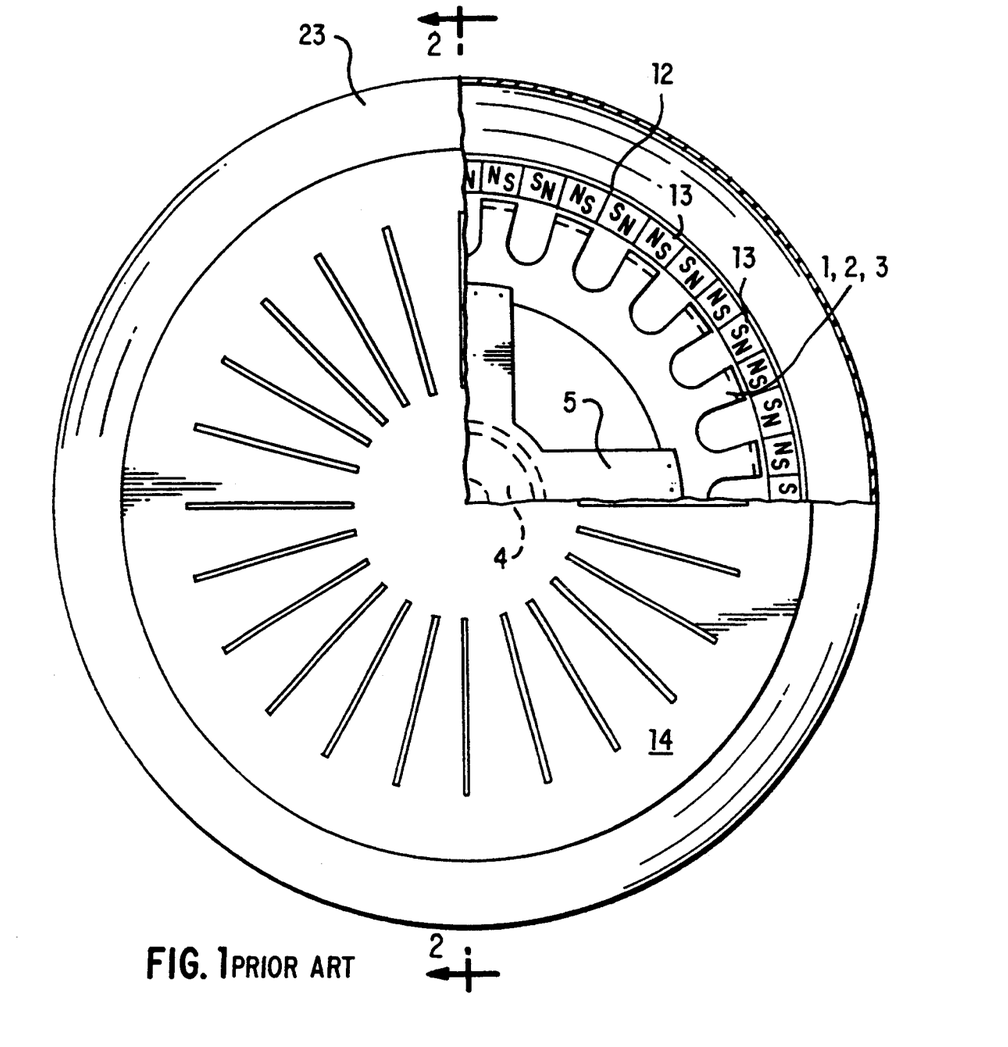
FIG. 1 shows an example of a motor wheel in accordance with the previous development stage, in a side view and partially in section.

In FIG. 1 is shown a motor wheel embodiment originally suggested during development toward the invention now present, said original motor wheel embodiment having a stator part comprising three cogged rings 1, 2, 3 (see also FIG. 2) connected to a hub 4 via spokes 5. The material in the rings 1, 2, 3 might be iron or some other magnetizable, sintered powder material designed for high frequencies. Between the cogged rings 1, 2, 3, see FIG. 2, windings 6 and 7 were mounted coaxially about an annular core 8 which was also coaxially arranged about the wheel hub 4. The rings 1, 2, 3 were mounted in tight engagement with or integrated with the core 8. The core 8 was preferentially made of the same material as the cogged rings 1, 2, 3. The spokes 5 formed a housing for bearing 9 for rotation of the rotor part axle 22. An axle neck 10 worked as an attachment means for the stator part. Bolts were used to keep the stator part together, e.g. in positions indicated by reference numerals 11.

The rotor part consisted in the development embodiment of a wheel rim 12 with inside permanent magnets 13 along the entire circumference. The circumferential width of these magnet areas, which either were constituted by separate permanent magnets or by an alternately magnetized ring, was approximately equal to the distance C between the cogs/teeth, see FIG. 3. A tire 23 was mounted on the rim 12.

Each magnet 13 had poles in a radial direction. The magnetic fields from the permanent magnets 13 were supposed to interact with the magnetic fields in the gaps existing between the cogged rings 1, 2, 3 on the stator part, i.e. gaps on the outside (in the radial sense) of the coils 6, 7. As it appears from FIG. 5, where the cogs/teeth 17, 18, 19, 20 are designed with a 90° bend as it appears from FIG. 4, the development embodiment was constructed so that the cogs were imparted a slanting shape, and in such a manner that opposite cog rims "entered a little into each other", with a small lateral gap. However, the cogs were shifted from one cog rim to another, in such a manner that from the outer left rim to the closest rim, cogs where shifted ½ cog period, while the back-to-back mounted cog rims in the middle had a respective cog shift of substantially ¼ cog period. The shift between the two cog rims on the right was the same as on the left side, i.e. ½ cog period.

The rim 12 was fixed to the axle 22 via a rim plate 14 made of a strong material. The rim plate 14 had slots to let air circulate for cooling the coil winding. The heated air was collected by the end pipe 16, optionally to be used for compartment heating. The rotor part rotated coaxially about the stator, and was as previously mentioned, supported by a bearing via axle 22.

In order to obtain practical use of the construction, i.e. in an electrically powered car, it is necessary that the motor develops a high starting torque. This was achieved in the development embodiment by making the number of permanent magnet poles 13 as large as practically feasible, and by having the number of cogs on the outer rings 1 and 3 the same as the number of permanent magnet poles of polarity M (or S) cooperating with the stator part. In a practical test embodiment of the development embodiment, 48 permanent magnet areas in an alternately magnetized ring were used.

On the ring 2 which comprised two cog rims, the same number of cogs/teeth were present, as the number of permanent magnet poles of polarity N and S cooperating with the stator part. The mutual locations of cogs on the cog rims appear schematically in FIG. 3, which figure shows that the cog width B is about equal to the distance C between cogs, and that the shift between the two central cog rims are B/2. Further, the cogs of the two outer cog rims are arranged so as to point substantially toward cog intervals of the rims on the inside.

Figure 6:
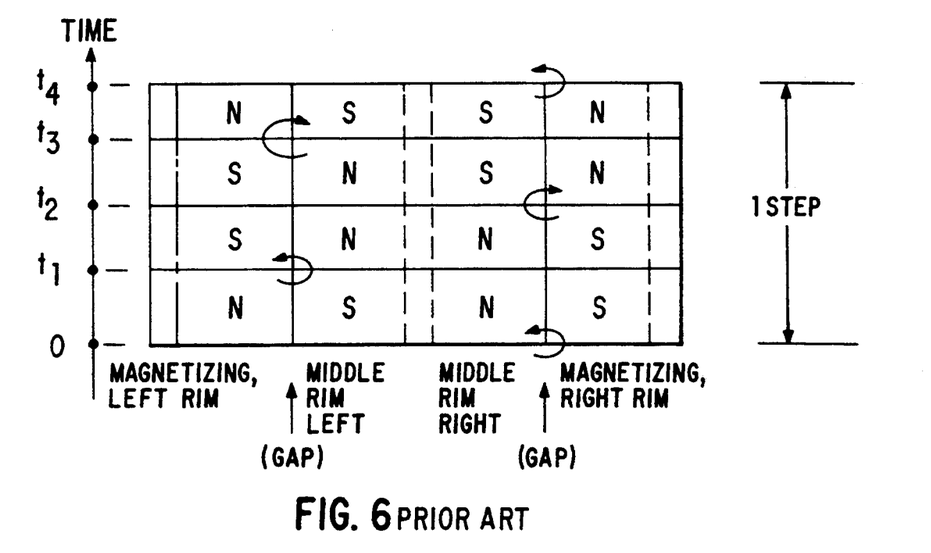
FIG. 6 is a scheme showing how field change or field reversal is controlled while the motor is operating.

When a voltage was supplied to the two coils 6, 7 via supply conductors not shown, a magnetic flux was established through the inside situated core 8 and through rings 1, 2, 3 to cogs 17, 18, 19, 20. By alternating current directions in coils 6, 7 in accordance with a carefully regulated scheme, a force influence on the rotor part was obtained, in such a manner that it moved stepwise. A course of alternations to drive the rotor part forward in one direction, is shown in FIG. 6:

FIG. 6 indicates the polarity of each of the cog rims as determined by electrical current direction in the coil therebelow. A start situation is shown at the bottom, with the left rim having polarity N, the next one S, the next rim N and the rim on the right side having polarity S. At a time $t_1$ the current direction in coil 6 is changed, so that the polarity of the two cog rims on the left change. The two rims on the right remain as before.

At a time $t_2$ (which is determined by the regulator and which is not necessarily equal to $2t_1$) the current direction in coil 7 is turned around, while coil 6 remains as before. Thus, the polarity is altered for the two cog rims on the right side, while the two rims on the left maintain their polarities.

At a new time $t_3$ the polarities of the two left side cog rims are alternated, while the two right side rim polarities are maintained, and this operation keeps on and on. The timings for alternations are adjusted for the regulator on the basis of measurements of the position, speed and rotation direction of the rotor part. The measurements were in the development embodiment made by Hall elements 21 which provided an indication of the instant positioning of the permanent magnets to the regulator control. Thereby it was possible to determine which polarity was desirable for a chosen rotation direction. Further, the Hall elements 21, together with further electronic circuitry would record the rpm. In a vehicle equipped with this type of drive in e.g. both rear wheels, a speed reduction for a wheel in a curve inside will cause a corresponding power supply/frequency increase to occur for the other wheel of the wheel pair, caused by an interplay between the Hall elements and the remaining electrical control means.

Figure 5:
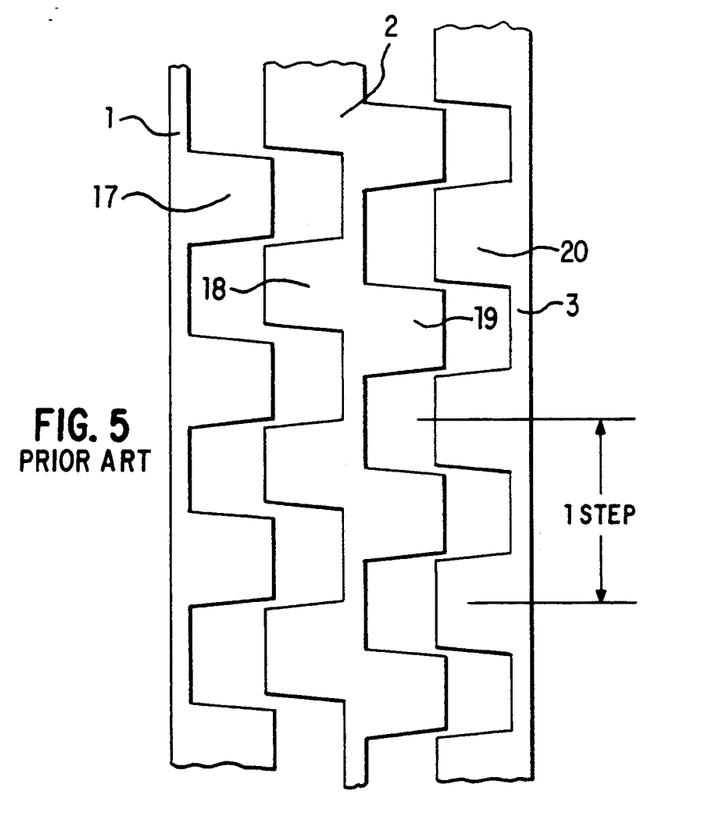
FIG. 5 shows a corresponding picture as FIG. 3, however, putting more emphasis on the presumably best geometrical embodiment of cogs/teeth and spacings.

By controlling that the electrical current direction is changed in such a manner that the cog magnetization takes a course as explained above in connection with FIG. 6, the motor would advance one full step, i.e. the distance from one cog/tooth to next cog on the same cog rim, see the indication "1 step" in FIG. 5 and FIG. 6.

By repeating this course of alternations at a high rate (adapted to the current wheel rotation speed), the wheel would would have a soft start and a uniform travel due to the high number of cogs/teeth and permanent magnets. It will be appreciated that by making alternations in a different consecutive order, the motor would have the opposite rotation direction.

As mentioned above, it would be possible to construct a wider motor, having several intermediate cog rims. The cog shift would then follow a corresponding pattern as the pattern already explained, it being rather simple to visualize that a new cog rim to the right of what is shown in FIG. 5, is mounted bak-to-back to ring 3 and having ¼ period shift, with cogs/teeth protruding to the right. Next one mounts on the outside to the right, a new outer right cog rim with teeth shifted furter ½ teeth period as a termination. Three, four or more coils (not shown) are then used, and coil energizing is then changed in accordance with an extended scheme in relation to the scheme shown in FIG. 6. Now, in FIGS. 7–13 is shown the further development of the motor which constitutes the present invention. In these figures, the same reference numerals as in previous FIGS. 1–6 are used, to the extent possible. However, the further development of the invention has resulted in some new elements which are shown by means of additional reference numerals.

Figure 9:
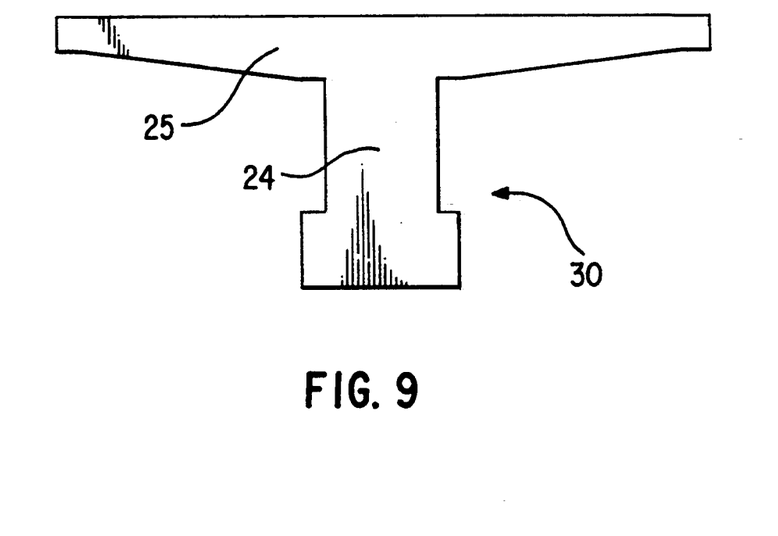
Figure 10:
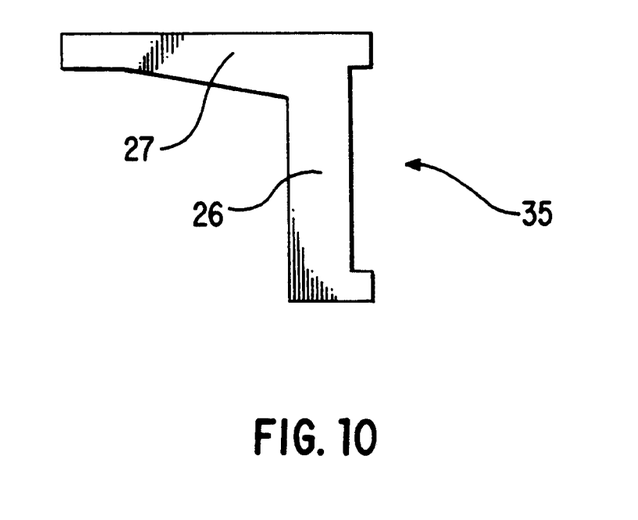

It turned out during development of the present invention, that it was necessary to provide a different design in order to bring sufficient magnetism forward in "the fingers" or "cogs/teeth" of what has previously been called "cog rims". In the novel construction, the inventor realized that it would be favourable to construct these "fingers" from thin metal sheets having a thickness of preferably about 0,3 mm. Thin sheet metal profiles were stamped out using respectively T and Γ shapes in accordance with what is shown in FIGS. 9 and 10. By adding preferentially about 40–50 pieces of such thin metal sheets together as a package, a lamella block 30 of the type shown in FIG. 9 was obtained, respectively a lamella block 35 of the type shown in FIG. 10. Each T and Γ consists generally of an upright stem 24, respectively 26, and a top beam 25, respectively 27.

Figure 7:
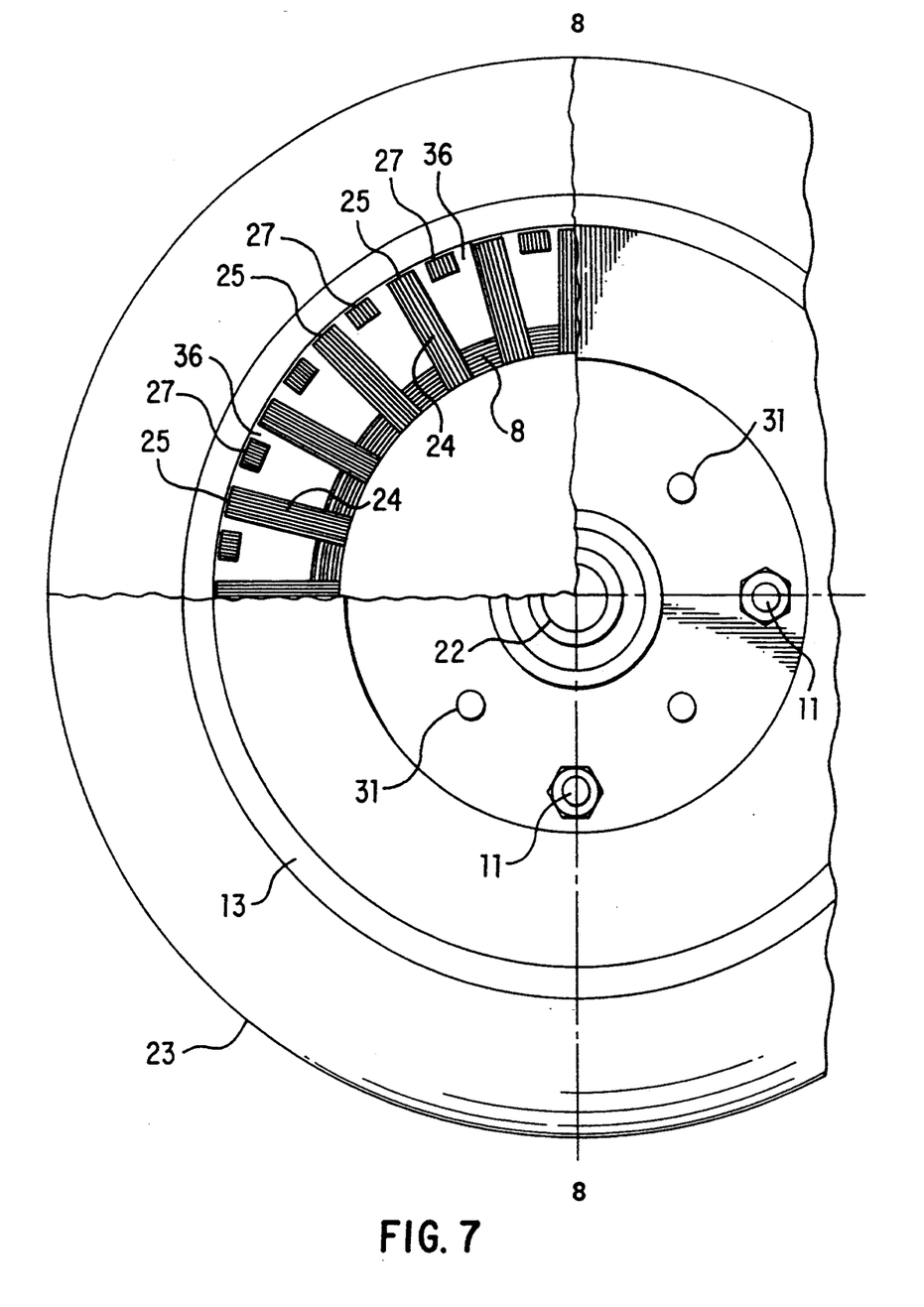

Instead of the cog rims which were used in the first development embodiment, having shifted cogs from one cog rim to the next, in the present case there are provided circularly arranged rows of radially standing T- and Γ-profiles, such as appears from FIG. 7. This figure shows the motor wheel in accordance with the invention in a side view, and in one "open" quadrant showing a section in a view along C—C in FIG. 8, one can see radially upright stems 24 of the T-profiles 30. On the radial outer end of these stems are located the top beams 25, and circumferentially between these top beams, the top beams 27 of the Γ-profiles 35 are located. (Strictly, these last mentioned top beams are not to be found in said section, since they do not reach all the way to the sectional plane, but they are drawn in the figure for the sake of lucidity. There is a gap 34 between the ends of the two Γ top beams which point towards each other.) Between top beams 25 and 27 there is a flux gap 36. The radially upright profile stems 24, 26 engage with their lower ends the annular cores 8.

Figure 2:
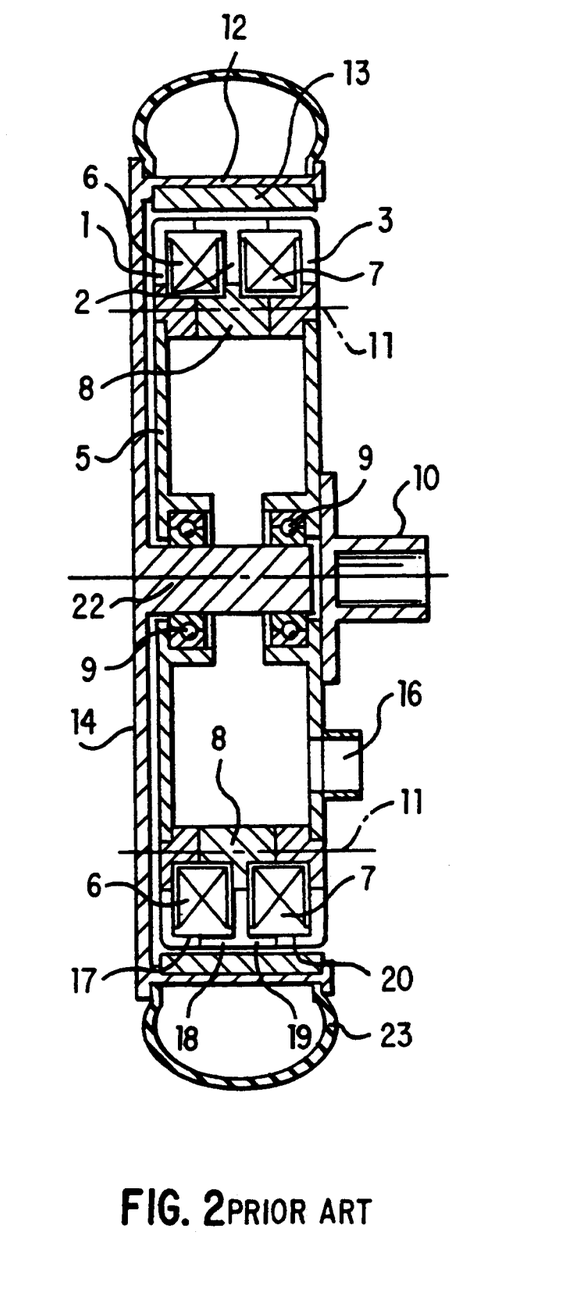
FIG. 2 shows a cross section through the same motor wheel as appears in FIG. 1 along line A—A.
Figure 3:
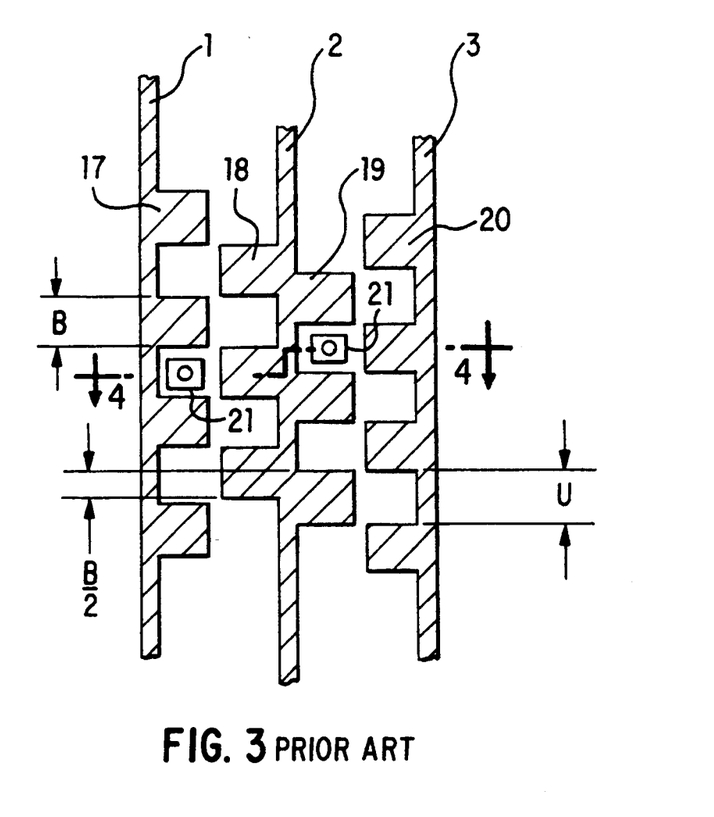
FIG. 3 shows part of the radially outward facing surface of the stator part, with four cog rims, the two cog rims in the middle being mounted together back-to-back.
Figure 8:
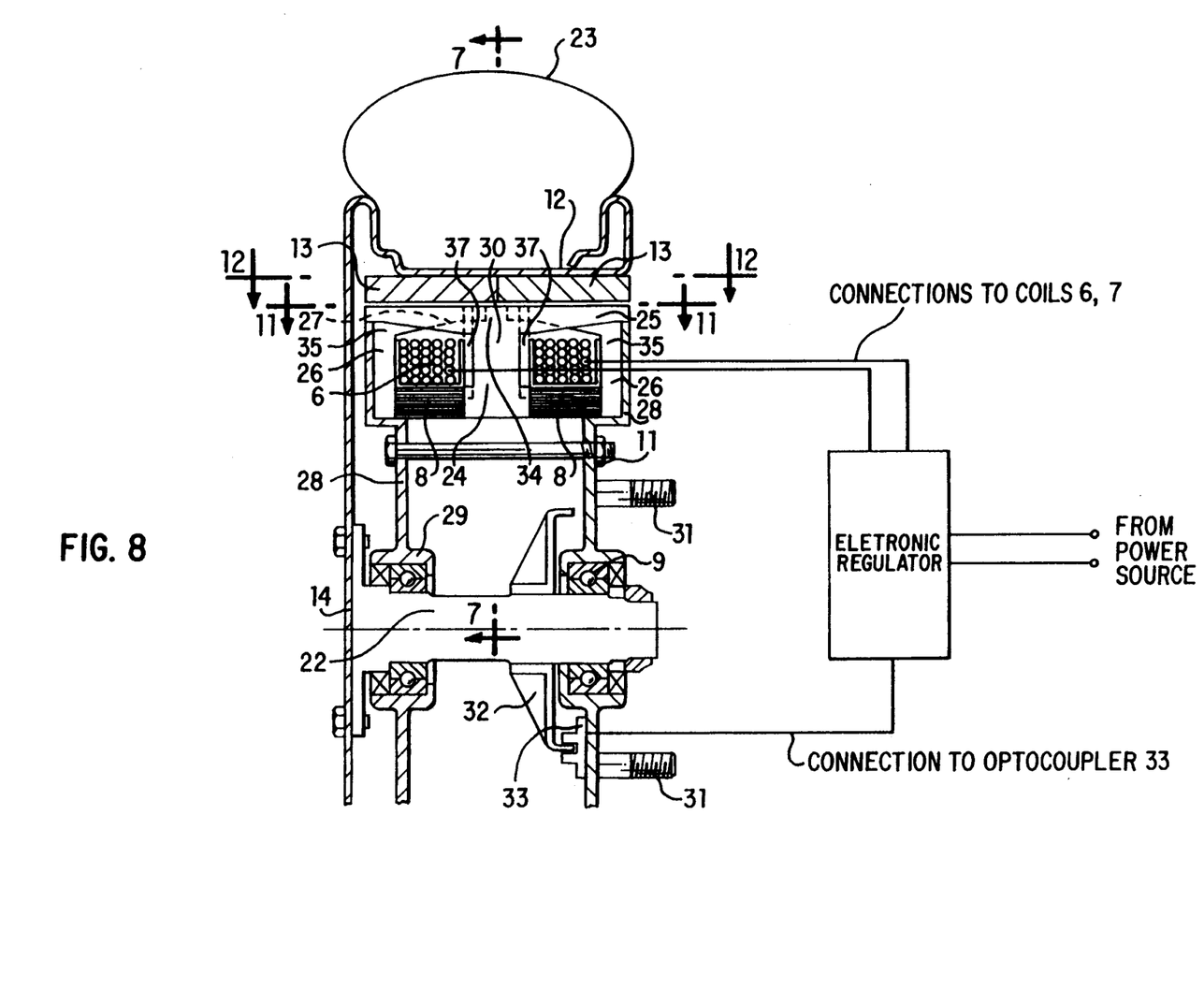

In FIG. 8 appears a view of the motor wheel which is similar to the view presented in FIG. 2. Here one attempts to show, by means of different types of shading, that the rotor magnets 13 in the shown cross section has different pole directions. This appears clearly in FIG. 12, where it is possible to see that in the motor in accordance with the present invention one uses shifted magnet rows in the rotor, i.e. not the same magnet in the axial direction, such as in the first embodiment attempt. In the embodiment shown in FIG. 8, namely an embodiment having two coils 6, 7 lying on each respective core 8, there are in correspondence with the two coils provided two separate rings of magnets 13, where the magnets are shifted one-half width from one ring to the next, see FIG. 12. In FIG. 8 appears also that the T- and Γ-profiles 30, 35 are arranged with their top beams in an axially straight configuration, i.e. not any more with circumferentially shifted cogs/teeth from one cog rim to the next in the axial direction, such as in the first embodiment attempt, cp. FIG. 3. The configuration in accordance with the invention appears most clearly in FIG. 11, where the profile top beams can be viewed radially from the outside. The gap 34 between two Γ top beams 27 facing each other, appears in this figure, and also the important flux gap 36 between two top beams extending in parallel directions. It is the magnetic field in this flux gap which interact with the magnetic field from the single magnet 13 in the outside magnet rings in the rotor.

Further details in FIG. 8 which must be mentioned, are in addition to the profiles or lamella blocks 30 and 35, side plates 28 which keep the stator together, which side plates include bearing housing 29 having rotating bearings 9, and which are held together by screws/bolts 11. The motor is attached by means of fixing screws 31.

Figure 4:
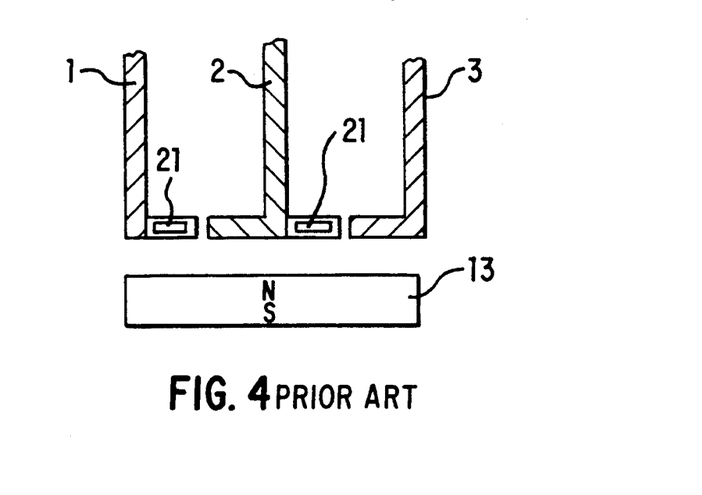
FIG. 4 shows part of the same cross section as in FIG. 2, where one rotor magnet and the outer, bent cog rims right inside, appear in closer detail.
Figure 11:
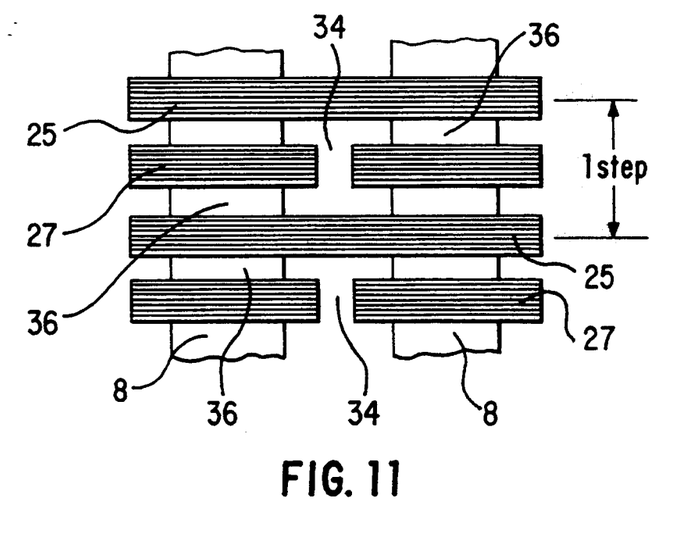
FIG. 11 shows the lamella blocks arranged in the topical geometry of the simplest embodiment of the invention, i.e. with two coils, in a view radially from the outside, in analogy with FIG. 3.
Figure 12:
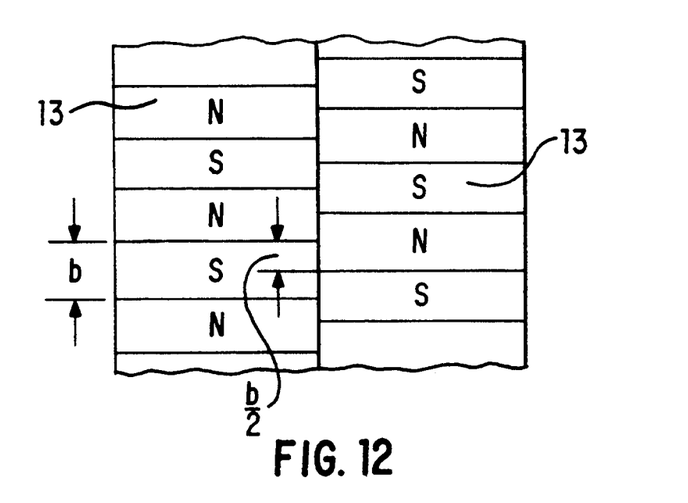
FIG. 12 shows the arrangement of single magnets in the rotor part in the same two-coil embodiment shown in FIGS. 7, 8 and 11.
Figure 13:
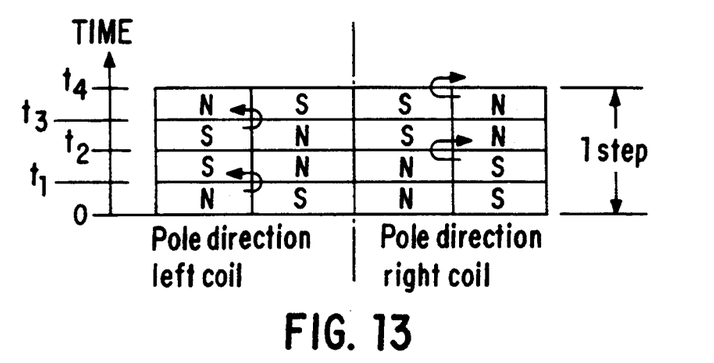
FIG. 13 shows a field reversal scheme which is analogous with the scheme shown in FIG. 6, for the two-coil embodiment of the present invention.

As an alternative to the Hall-elements mentioned previously in the specification in connection with FIGS. 3 and 4, which elements can also be used in connection with the invention as now present, in FIG. 8 is shown an index disk 32 which in cooperation with an opto-coupler 33 is adapted to provide measurement of the rotor position and rotation speed, to provide data for the control electronics. In order that the motor shall move one step as shown in FIG. 11, it is necessary that a magnetization course takes place in the profiles or lamella blocks 30, 35 as appears from FIG. 13. This course is quite similar with the course indicated in FIG. 6, and can be described as follows: In FIG. 13 are indicated the pole directions for the two coils, respectively termed left coil and right coil. The polarities are determined by the electric current directions in the coils. A start situation is shown at the bottom, where the left coil is polarized in one direction, i.e. with its south pole toward the right, and the right coil for the moment polarized in the same direction, i.e. with its south pole toward the right. At a time $t_1$ the current direction is changed in the left coil, so as to change the pole directions. At this time, i.e. $t_1$, no change occurs for the right coil.

At a time $t_2$ (which is determined by the regulator, and which time is not necessarily equal to $2t_1$), the current direction in the right coil is turned around, while the left coil remains as before. Thus, the pole direction changes for the right coil, while the left coil maintains its pole direction.

At a new time $t_3$, the pole direction is changed around again for the left coil, while the pole direction of the right coil is maintained, and this keeps on and on. The times for alternation are adjusted by the regulator on the basis of measurements of the position, speed and rotation direction of the rotor part.

Reference numeral 37 refers to rings having notches on the outside and the inside, for fixation and holding the lamella blocks 30, 35.

The manner of arranging profiles now indicated in accordance with the present invention, makes the magnetic flux in the flux gaps 36 take on a direction which is the same as the rotation direction of the motor, and not substantially in a slanted direction, which was the case in the previous experimental embodiment.

The annular cores 8 below coils 6, 7 consists preferentially of a spun coil of thin sheet metal filling both spaces found between the lower parts of the T- and Γ-profiles.

The operation manner of the motor in accordance with the invention is quite analogous to what has been described above regarding the development embodiment, and need not be repeated. Besides, in the same manner as mentioned in connection with the development embodiment, it is possible to construct a wider motor, having several coils and correspondingly several T-profiles arranged therebetween. On each outside there will always be arranged Γ-profiles with top beams pointing inward. For the rest, T-profiles will be standing between the coils. The operation manner for energizing the coils will then follow an extended scheme in the same manner as previously mentioned.

An important additional characteristic of the motor here described, is that it is used in a vehicle, will be able to charge the batteries when moving downhill, in a reversed working mode, i.e. it is able to work as a generator. Thus, this motor may also be used as a magnetic braking device.

I claim:

1. Electric stepper motor having a stator part and a rotor part of substantially cylindrical shape, said stator part comprising at least two annular coils (6, 7) wound on respective annular cores (8), said cores (8) being arranged in parallel with each other and with a common axis which is the motor axis, said coils (6, 7) being separately fed AC current from an electronically controlled current source to magnetize alternatingly a number of flux-conducting elements comprised by said stator part and positioned successively along a direction of a circumference of a cylinder to form a series of flux gaps (36) with flux directions substantially along a circumferential direction between the elements, said elements (30, 35) being in engagement with said cores (8) of said coils (6, 7) to conduct magnetic flux therefrom and toward and through said flux gaps (36), and where said rotor part is constituted by a wheel which is arranged concentrically on an outside of said stator part, said wheel being equipped on a radial inside part with magnets (13) for interaction with magnetic fields of the stator part, said magnets (13) having only a small clearance to a radially outer surface of said stator part, and being arranged with a pole direction pointing radially and with alternatingly north pole and south pole toward the stator part in a circumferential direction, characterized in that a) the flux-conducting elements are generally T- and Γ-shaped profiles (30, 35) arranged with a lower end of each T-profile stem (24) between and engaging two neighboring ones of said cores (8) and a lower end of each Γ-profile stem (26) on an outside of and engaging one of the two annular cores (8), every profile stem (24, 26) extending outward in a radial direction past said coils (6, 7) and being uniformly distributed in circularly arranged rows between and on an axial outside of said coils (6, 7), top beams (25, 27) of the T-profiles (30) and the Γ-profiles (35) pointing in a direction parallel to said axis, the Γ top beams (27) pointing toward an opposite axial outside of said coils (6, 7), and each having a radially outer boundary surface lying substantially flush with an outer cylinder surface of the stator part, the profile stems (24, 26) being arranged in a shifted order from one circularly arranged row to the next such that each outer coil (6, 7) on its radial outside is covered in equal and uniformly distributed, successive sectors by alternatingly a Γ-profile top beam (27) and a T-profile top beam (25) with a circumferential flux gap (36) therebetween, and in such a manner that each axially inside coil is covered in a corresponding manner by top beams (25) having T-profiles (30) with stems (24) alternatingly on one axial side and the other axial side of the AC current coil, with the same circumferential flux gap also between these top beams (25), and top beams (25, 27) having Γ-profiles and T-profiles (35, 30) pointing toward each other in a direction parallel to said axis, being cut lengthwise to provide axial clearances (34) therebetween, and that, b) each magnet (13) in the rotor part has an extent in the circumferential direction which substantially corresponds to a circumferential center distance between two circumferentially neighboring top beams (25, 27) in an outer cylinder surface of the stator part, and lie in a close arrangement to constitute a magnet ring, the same number of such magnet rings as a number of coils (6, 7) in the stator part, being provided closely next to each other in a direction parallel to the axis, however, with each successive magnet (13) in the ring shifted in the circumferential direction one-half magnet sector in relation to the magnets (13) in a neighboring ring.

2. The electric stepper motor of claim 1, characterized in that each T-profile top beam (25) protrudes axially substantially somewhat beyond width of the coils (6, 7) on the two neighbour cores (8) adjacent to one of the stems (24) of one of said profiles, and that each Γ-profile top beam (27) protrudes axially somewhat beyond the width of its adjacent annular coil (6, 7).

3. The electric stepper motor of claim 1, having two coils in the stator part, characterized in that a length of each T-profile top beam (25) substantially defines an axial extent of the stator part, said stator part only comprising one single circularly arranged row of T-profile stems and two axially outer, circularly arranged Γ-profile stem rows where each Γ-profile top beam (27) points directly toward an oppositely arranged Γ top beam (27).

4. The electric stepper motor of claim 1, having three coils in the stator part, characterized in that successive pairs having one Γ-profile and one T-profile (35, 30) are provided on said stator part in the circumferential direction, the two circumferentially neighboring top beams (27, 25) of a pair pointing right toward each other in an axial direction, the order regarding Γ-profile and T-profile being reversed for each successive pair, and an axial extent of said stator part being defined substantially by a sum of a length of one T top beam (25) and one Γ top beam (27), plus said clearance (34).

5. The electric stepper motor of claim 1, having four or more coils in the stator part, characterized in that successively arranged, axis-parallel rows of T-profiles (30) are provided on the stator part in the circumferential direction, the T-profiles of each successive row being shifted in relation to a previous row a distance equal to an axial center distance between the coils, and there being provided in every other successive axis-parallel row at one or both outer ends thereof, the top beam (27) of a Γ-profile (35), the axial extent of said stator part substantially being defined by a sum of the lengths of the T top beams (25) plus (a) possible Γ top beam(s) (27) plus clearances (34) therebetween, in one axis-parallel row.

6. The electric stepper motor of claim 1, characterized in that the magnets (13) in the rotor part are separate permanent magnets.

7. The electric stepper motor of claim 1, characterized in that the magnets (13) in the rotor part are separately magnetized areas of one magnet ring.

8. The electric stepper motor of claim 1, characterized in that said T- and Γ-profiles (30, 35), the stator coils (6, 7) and an electronic regulating device are adapted for in cooperation magnetizing the profile top beams (25, 27) in such a manner that a field direction in the flux gaps (36) between circumferentially neighbouring top beams (25, 27) are inverted in axial consecutive order, above every other coil one at a time, thereby to provide a cycle of field direction reversals in the flux gaps (36) successively in one axial direction, said cycle being repeated at a rate which is adapted to an instant rotation speed of the wheel.

9. The electric stepper motor of claim 1, characterized in that Hall-elements (21) signal-wise connected to an electronic regulating device, are adapted for detecting the wheel rotation speed and the positions of the magnets (13), for controlling the magnetic fields of the stator part.

10. The electric stepper motor of claim 1, characterized in that said rotor part is equipped with an index disk (32) with notches running through at least one opto-coupler (33) connected to an electronic regulating device for detecting speed of the wheel and the positions of the magnets (13), for controlling the magnetic fields of said stator part.

* * * * *